United States Patent [19]
Armbruster et al.

[11] 3,849,194

[45] Nov. 19, 1974

[54] LOW D.E. STARCH CONVERSION PRODUCTS

[75] Inventors: Frederick C. Armbruster; Earl R. Kooi, both of La Grange, Ill.

[73] Assignee: CPC International Inc., Engelwood Cliffs, N.J.

[22] Filed: Sept. 17, 1971

[21] Appl. No.: 181,566

Related U.S. Application Data

[63] Continuation of Ser. No. 602,563, Dec. 19, 1966, abandoned.

[52] U.S. Cl. ............................. 127/29, 195/31 R
[51] Int. Cl. ...................... C12b 1/00, C13k 1/06
[58] Field of Search.................. 195/31 R; 127/29

[56] References Cited
OTHER PUBLICATIONS

Wallerstein Company, Technical Bulletin, No. 236, (Apr. 1964).

Wallerstein Company, Data Sheet, No. 242, (Jan., 1965).

*Primary Examiner*—Lionel M. Shapiro
*Attorney, Agent, or Firm*—Albert P. Halluin; Frank E. Robbins

[57] ABSTRACT

The present invention provides a process for preparing low D.E. waxy starch hydrolysates and low D.E. waxy starch conversion syrup products which are both liquid and solid. Waxy starch is treated with bacterial alpha amylase at a temperature above 85°C to liquify the waxy starch, then cool the liquified waxy starch to about 80°C, then convert the liquified waxy starch with bacterial alpha amylase to a D.E. from about 5 to about 25. By concentration from the resulting hydrolysate, a non-hazing syrup is obtained. Non-hygroscopic water-soluble solids are also obtained by further drying to a moisture content of less than about 15 percent.

14 Claims, No Drawings

LOW D.E. STARCH CONVERSION PRODUCTS

CROSS-REFERENCE TO RELATED APPLICATIONS

This application is a continuation of U.S. application Ser. No. 602,563, filed Dec. 19, 1966, now abandoned.

The present invention relates to a process for preparing low DE starch hydrolysates and low DE starch conversion syrups. The present invention also relates to the resulting products. DE is an abbreviation for dextrose equivalent, which is a common expression in the art for describing the total reducing sugars content of a material, expressed as percent dextrose, dry basis.

Conventionally, low DE starch conversion syrups have been produced by the hydrolysis of starch with acids. The primary emphasis in the preparation of commercial starch hydrolysate syrups has been on attaining stability, clarity and non-crystallizing characteristics.

There is a large potential market for syrups and syrup solids with bland taste, low sweetness and low hygroscopicity at a low DE level. Such syrups, hydrolysates, and syrup solids are useful as bases for the preparation of food items as well as for bodying agents and as additives having non-sweet, water-holding, non-hygroscopic characteristics. Other applications include use as a carrier for synthetic sweeteners, as a flavor enhancer, as an additive for coloring agents, as a spray drying adjunct for coffee extracts or tea extracts, as a bulking or bodying dispersing agent in synthetic creams or coffee whiteners, as a moisture holding agent in breads, pastries, meats, and as a bodying and smoothing agent in puddings, soups and frozen iced desserts.

Low DE syrups having a DE less than 28 to 30 are not practical to produce from ordinary starches by the process of the prior art. Previous attempts to produce low DE syrups from ordinary starches failed by way of extremely poor filtration rates, yield losses and substantial insolubility of syrup solids.

One object of the present invention is to provide a novel, low DE starch hydrolysate product.

Another object of the present invention is to provide a low DE syrup that is clear and stable.

A further object of the present invention is to provide a bland-tasting, low sweetness, non-hygroscopic, low DE starch hydrolysate product.

Still another object of the present invention is to provide a syrup solids product with improved characteristics with respect to hygroscopicity and water solubility.

Another object of the present invention is to provide syrups and syrup solids for use in food products, the syrup products having a minimum effect on flavors while simultaneously providing bulk and/or stability to the food product.

A related object of the invention is to provide new practical processes for the manufacture of syrups and syrup solids and starch hydrolysate products of the character described.

A similar object of the invention is to provide new practical processes for the manufacture of starch hydrolysates that may be clarified and remain clear at high solids concentration.

Other objects of the present invention will be apparent hereinafter from the following description and from the recitals of the appended claims.

The present invention provides a process for preparing a novel low DE starch hydrolysate. This process comprises subjecting a mixture of starch and water, having a solids content less than about 50 percent, to the hydrolytic action of bacterial alpha amylase to obtain a starch hydrolysate having a DE between about 5 and about 25, and that is also characterized by having the sum of the percentages of saccharides therein, dry basis, having a degree of polymerization of 1 to 6, divided by the DE, provide a ratio greater than about 2.0. This ratio is referred to hereafter as the characteristic or descriptive ratio.

The present invention also provides a process for preparing a novel, low DE syrup, by the concentration of a starch hydrolysate produced in accordance with this invention to produce a syrup having a solids content greater than 50 percent. The syrup, i.e., concentrated hydrolysate, may or may not be refined by conventional means.

The present invention also provides a process for preparing syrup solids, by reducing the moisture content of either a starch hydrolysate or a syrup, produced in accordance with this invention, to a moisture content of less than 15 percent.

It has been discovered that syrups and starch hydrolysate products may be obtained from waxy starches by application of the hydrolytic enzyme to the starch to yield a starch hydrolysate having a DE between about 5 and about 25, and having a descriptive ratio of at least about 2.0.

Suitable waxy starches include waxy milo, waxy maize, and waxy rice. Suitable enzyme preparations include alpha amylase enzyme preparations of bacterial origin.

One preferred method of practicing the present invention involves the steps of slurrying waxy starch in water to a density of between 5° and 30° Baume, solubilizing the starch by gelatinization; and subjecting the mixture to treatment with bacterial alpha amylase to hydrolyze the starch to a DE of 5 to 25. The conversion step is carried out at a temperature in the range between about 50° and about 95°C. The mixture is held at the conversion temperature for a period of time ranging from a few minutes to as long as one or two hours or perhaps more. During this time, the starch is converted to a DE between 5 and 25.

The pH of the conversion medium is preferably that which is suitable for the optimum activity of the bacterial alpha amylase. Generally, the pH range is between about 6.0 and about 8.0. The most suitable temperature range lies between that required for gelatinizing starch, which is at least about 60°C, and that at which the enzyme will lose a large portion of its activity, which is about 95°C. It has been found that the preferred temperature range is between about 85°C and about 92°C.

The preferred enzyme used for the conversion of waxy starch to low DE syrups in accordance with the present invention is the type commonly referred to in the art as bacterial alpha amylase. It is a starch liquefying, heat-resistant, hydrolytic alpha amylase. Suitable bacterial alpha amylase may be produced by certain strains of *Bacillus subtilus*, *Bacillus mesentericus*, and the like, by conventional fermentation methods.

HT-1000, the proprietary name of a bacterial alpha amylase preparation produced and marketed by Miles Chemical Laboratories, is an example of an enzyme preparation that is suitable for use in the present invention. Other suitable bacterial alpha amylases include Rhozyme H39, manufactured and sold by Rohm and Haas, and CPR-8, manufactured and sold by the Wallerstein Division of Baxter Laboratories, Inc.

The production of low DE conversion syrups from waxy starch involves solubilizing the starch in an aqueous medium at a temperature above the gelatinization temperature of the starch, e.g., above about 60°C, liquefying the gelatinized starch with a bacterial alpha amylase preparation at a temperature below the inactivation temperature of the emzyme, i.e., below about 95°C, and further converting the liquefied starch with the bacterial alpha amylase to a DE of about 5 to about 25.

Starch solubilization may be accomplished, for example, by heating a starch water slurry above the gelatinization temperature of the starch or by adding dry starch to heated water, or by other similar means. Similarly, the bacterial alpha amylase preparation may be added to the starch before, during, or after the starch is gelatinized and the final conversion of the starch may be accomplished with the enzyme also used for liquefying the starch, or if desired, an additional amount of the bacterial alpha amylase preparation may be used to shorten the conversion time required to reach the desired DE.

The quantity of bacterial alpha amylase preparation required for obtaining the desired starch hydrolysate will be dependent on the activity of the bacterial alpha amylase preparation, the conversion temperature of the conversion medium, the pH of the medium, and the desired terminal DE. Optimum conditions are easily selected. For example, a bacterial alpha amylase preparation having an activity substantially equivalent to the HT-1000 product of Miles Chemical Laboratories would be used in an amount between about 0.025 percent to about 0.1 percent by weight of the starch on the dry basis. The conversion conditions would include a temperature of about 80°C and a pH of about 7 for a period of time sufficient to attain the desired DE.

Generally, 30 to 60 minutes is sufficient for substantial gelatinization and liquefication of the starch. An additional 30 to 60 minutes is generally sufficient for saccharification of the starch back to the terminal DE. When the desired DE is reached, conversion action may be stopped by adjusting the pH to 4.5 or below, or by heating the conversion mixture to a temperature above the inactivation temperature of the enzyme.

It is desirable to operate at a relatively high dry substance level up to about 50 percent, and preferably in the range of between about 20 percent and about 40 percent, i.e., about 10° to about 20° Baume. When operating at a high dry substance level, the required tank volume for conversion is reduced, as are evaporation costs. However, the process is suitably operable at dry substance concentrations outside of this range.

The liquefying and saccharifying conditions may be varied within certain limits dictated by the stability and activity characteristics of the enzyme and the gelatinization properties of the starch.

After termination of the enzyme conversion, the resulting starch hydrolysate has a solids content less than 50 percent. It may be used in unaltered form as a desirable product for the uses suggested heretofore. In addition, the starch hydrolysate may be concentrated and/or refined to yield a syrup having a solids content greater than 50 percent. Generally, industry prefers use of a syrup of higher solids content both because it is advantageous in shipping and in applications.

The refining of the hydrolysate is achieved by conventional refining methods. These include treatment with vegetable carbon, ion exchange resins, filtration, centrifugation, and the like.

The invention will now be further described in detail by means of several exemplary demonstrations thereof.

EXAMPLE 1

An aqueous starch slurry was prepared containing 30 percent solids by weight of waxy milo starch. The temperature of the slurry was raised and held between 85°C and 92°C. A bacterial alpha amylase preparation was added in an amount just above 0.025 percent by weight of the starch over a period of slightly more than 30 minutes. The mixture was then held at the same temperature for an additional period of 30 minutes. The waxy starch was liquefied and had a D.E. of 2.79. The temperature was then reduced to below 80°C and the conversion was allowed to continue until the desired DE was reached. The temperature of the mixture was then suddenly raised to about 120°C in order to inactivate the enzyme and terminate the conversion.

Table 1 below sets forth typical saccharide analyses of low DE hydrolysates obtained in accordance with the above procedure. DP designates the range of polymerization. $DP_1$ represents the total quantity expressed in percent by weight dry basis of monosaccharides present in the hydrolysate. $DP_2$ represents the total quantity of disaccharides percent in the hydrolysate and so forth.

Included in Table 1 are analyses of typical acid hydrolysates for comparative purposes.

TABLE I

TYPICAL SACCHARIDE ANALYSES

| Hydrolysate Composition | DE | | | | |
|---|---|---|---|---|---|
| | 5 | 10 | 15 | 20 | 25 |
| A. Enzyme hydrolysis | | | | | |
| $DP_1$ | 0.1 | 0.3 | 0.7 | 1.4 | 2.4 |
| $DP_2$ | 1.3 | 3.4 | 5.5 | 7.6 | 9.7 |
| $DP_3$ | 1.8 | 4.3 | 6.9 | 9.4 | 12.0 |
| $DP_4$ | 1.8 | 3.5 | 5.2 | 6.9 | 8.6 |
| $DP_5$ | 1.8 | 3.6 | 5.5 | 7.4 | 9.3 |
| $DP_6$ | 3.3 | 7.0 | 10.6 | 14.3 | 18.0 |
| $DP_7$ and higher | 89.9 | 77.9 | 65.6 | 53.0 | 40.0 |
| Total $DP_{1 \to 6}$ | 10.1 | 22.1 | 34.4 | 47.0 | 60.0 |
| Descriptive ratio | 2.0 | 2.2 | 2.3 | 2.4 | 2.4 |

TABLE 1—Continued

TYPICAL SACCHARIDE ANALYSES

| | | | DE | | |
|---|---|---|---|---|---|
| | 5 | 10 | 15 | 20 | 25 |
| Hydrolysate Composition | | | | | |
| B. Acid hydrolysis (prior art process) | | | | | |
| DP$_1$ | — | 2.3 | 3.7 | 5.5 | 7.7 |
| DP$_2$ | — | 2.8 | 4.4 | 5.9 | 7.5 |
| DP$_3$ | — | 2.9 | 4.4 | 5.8 | 7.2 |
| DP$_4$ | — | 3.0 | 4.5 | 5.8 | 7.2 |
| DP$_5$ | — | 3.0 | 4.3 | 5.5 | 6.5 |
| DP$_6$ | — | 2.2 | 3.3 | 4.3 | 5.2 |
| DP$_7$ and higher | — | 83.8 | 75.4 | 67.2 | 60.7 |
| Total DP$_1 \rightarrow {_6}$ | — | 16.2 | 24.6 | 32.8 | 41.3 |
| Descriptive ratio | — | 1.6 | 1.6 | 1.6 | 1.7 |

It is readily seen from Table 1 that hydrolysis of a waxy starch with bacterial alpha amylase to a DE between 5 and 25 provides a descriptive ratio of at least 2.0 whereas acid hydrolysis fails entirely to produce a hydrolysate having this ratio.

It was observed that the hydrolysates prepared by enzyme hydrolysis of waxy starch exhibited extraordinary clarity and substantially complete lack of opaqueness whereas the acid hydrolysates were decidedly opaque and exhibited little clarity except above DE of at least 25.

The procedure of this example was carried further and enzyme hydrolysates having DE's of 10, 20, and 25 were filtered and concentrated to produce examples of syrups. The 10 DE hydrolysate was filtered and concentrated to 64–70 percent solids by weight. The syrup exhibited exceptional clarity. Likewise, hydrolysates having DE's of 20 and 25 were filtered and concentrated to 75 and 80 percent solids by weight respectively, and also exhibited exceptional clarity and complete lack of opaqueness.

Thus, it has been shown that the hydrolysates and the syrups of this invention are substantially more water soluble and exhibit improved clarity and lack of opaqueness compared to acid conversion products currently available.

EXAMPLE 2

This example illustrates the preparation of low DE syrups, exhibiting excellent stability to haze formation, from three different waxy starches.

To 30 percent by weight aqueous suspensions respectively of unmodified waxy maize, waxy rice, and waxy milo starches, each at a pH of 7.2, was added HT-1000 bacterial alpha amylase preparation at a concentration of 0.025 percent on a starch solids basis. Each starch suspension was heated to 90° to 92°C over a 60 minute period and was held at that temperature for an additional 60 minutes to reach a DE of about 5.

The alpha amylase activity was destroyed by adjusting the pH to less than 4.5. After cooling to 60°C and readjusting the pH to 7.2, additional enzyme was added and the hydrolysis continued to the respective DE values of 10, 15, 18 and 20 in a 48 hour period at 60°C.

| APPROXIMATE DE VALUE | PERCENT ENZYME REQUIRED BASED ON STARCH |
|---|---|
| 5 | 0.025 |
| 10 | 0.0011 |
| 15 | 0.0022 |
| 18 | 0.0044 |
| 20 | 0.0088 |

Following conversion, the resulting hydrolysates were adjusted to pH 3.8 to 4.0 and refined for 30 minutes at 60°C with activated carbon at a level equivalent of 1 percent of the hydrolysate dry substance and filtered. Filtrates were adjusted to pH 5.0 and refrigerated at 5°C to promote haze formation.

Haze development will vary considerably in prior art low DE hydrolysates depending upon the temperature at which the hydrolysates are held, the solids concentration, and the degree of hydrolysis as reflected by the DE value as well as other factors. In the extreme cases, the hydrolysate can become completely opaque and set up solids such as in a paste. In lesser but still extreme cases, haze particles may be found to agglomerate and settle toward the bottom of the liquor, resembling sludge. In lesser instances, haze particles appear too fine and too dispersed to agglomerate to a marked degree. They therefore remain in suspension lending the hydrolysate a cloudy appearance. In each of these cases, the optical clarity of the liquors is adversely affected.

Haze formation may therefore conveniently be determined by measuring the amount of light passing through a sample of the hydrolysate as compared to that passing through a blank of distilled water. This is used as a test for determining the clarity and stability of hydrolysates prepared in accordance with this example. The hydrolysates of this example were examined spectrophotometrically by measuring the light transmittance percent at 600 mµ through 4 centimeter cells each containing portions of the hydrolysates, respectively, which had first been held 3 days at 5°C. The relative stability of low DE hydrolysates prepared from waxy starches by enzyme hydrolysis is indicated by the very high light transmittance values observed, which are presented in the following table.

Table 2

| DE Value | % LIGHT TRANSMITTANCE | | |
|---|---|---|---|
| | Waxy Maize Starch | Waxy Rice Starch | Waxy Milo Starch |
| 10 | 97.4 | 95.6 | 91.8 |
| 15 | 98.5 | 93.2 | 93.0 |
| 18 | 98.6 | 93.0 | 92.9 |
| 20 | 98.8 | 85.0 | 92.8 |

In contrast, hydrolysates prepared under identical conditions from non-waxy starches, such as potato, red milo, tapioca, wheat, rice, corn and the like, either failed to furnish clear, haze-free hydrolysates because they could not be filtered at any appreciable rate after conversion; or, after filtration was achieved, the clarified hydrolysates soon exhibited haze formation, often becoming completely opaque, by exhibiting 0% light transmittance within 3 days at 5°C.

To further illustrate the superiority of the low DE products of this invention, hydrolysates prepared from waxy starches were concentrated by evaporation to 65 percent solids to produce syrups of excellent non-hazing properties. By comparison, concentration of hydrolysates prepared from non-waxy starches succeeded in only accelerating and intensifying haze formation.

The hydrolysate product of the present invention may be concentrated and/or refined to produce syrups or syrup solids. The syrup solids are obtained by reducing the moisture content of the syrup to less than 15 percent, preferably about 4 percent. The syrup solids exhibit 100 percent water solubility and are completely free of haze.

The descriptive ratio [$DP_{1 \to 6}/DE$] is a convenient method for the determining of the characteristics of the hydrolysate or syrup. If the descriptive ratio is at least about 2, the product is highly water soluble and exhibits almost no haze formation. If the descriptive ratio is substantially below 2, i.e., 1.6 or less, the products exhibit haze formation and are less water soluble than products with a ratio of at least 2.

The hydrolysates of this invention, whether in the form of dilute or concentrated syrups, or in the form of dry solids, are characterized by blandness of taste and low sweetness, and they are non-hygroscopic. They are fully and readily soluble in water. When used in food products, they have a minimal effect upon flavor, while providing bulk and stability, together with increased nutritive value.

These characteristics make the products of invention particularly suitable for applications such as, for example, carriers for synthetic sweeteners, flavors, coloring agents and essences; spray drying adjuncts for coffee extracts and tea extracts; bulking, bodying, and dispersing agents in synthetic creams or coffee whiteners; ingredients promoting moisture retention in bread, pastry, and meats; and as components of dry soup mixes, bakery mixes, frosting mixes, spice mixes and blends, beverage powders, condiments, gravy mixes, sauce mixes, the frozen dairy foods. In addition, they are useful in the formulation of anti-caking agents, tableting compounds, whipped products, protective coatings, agglomeration aids, and low - or reduced-in-calorie foods and beverages.

When the starch hydrolysate products, or syrups or syrup solids of the invention are used as solutions, at a solids concentration of less than about 40 percent by weight, they are particularly attractive because of their bland flavor, low hygroscopicity, low sweetness, and ready solubility. They impart density and good mouthing characteristics without noticeably affecting viscosity or flavor. At solids concentrations above about 40 percent, the solutions contribute significantly to the viscosity characteristics of any system in which they are employed.

While the invention has been described in connection with specific embodiments thereof, it will be understood that it is capable of further modifications and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention and the limits of the appended claims.

We claim:

1. A process for producing a waxy starch hydrolysate which comprises treating in a first step an aqueous slurry of waxy starch with a bacterial alpha-amylase enzyme at a temperature above about 85°C. to liquefy the waxy starch and to provide an aqueous solution containing a liquefied waxy starch, then subsequently in a second step, at reduced temperatures below about 85°C, treating said liquefied waxy starch with a bacterial alpha-amylase enzyme to saccharify the waxy starch and to achieve a waxy starch hydrolysate having a dextrose equivalent value from about 5 to about 25, stopping the saccharification reaction and recovering the waxy starch hydrolysate so produced.

2. A process in accordance with claim 1, wherein the liquefaction is carried out using a bacterial alpha-amylase enzyme at a temperature from about 85°C. to about 92°C. and at a pH of from about 6 to about 8.

3. A process in accordance with claim 1, wherein the liquefied waxy starch from the first step has a D.E. of about 2.79.

4. A process in accordance with claim 1, wherein the liquefaction is carried out at a temperature in the range of from about 90°C. to about 92°C. and a pH of from about 6 to about 8.

5. A process in accordance with claim 1, wherein the liquefied waxy starch from the first step has a D.E. of about 5.

6. A process in accordance with claim 1, wherein the saccharification is carried out under conditions to produce a hydrolysate product having a dextrose equivalent value from about 5 to about 25 and a descriptive ratio of at least about 2, wherein the descriptive ratio is the quotient obtained by dividing the sum of the percentage of saccharides, dry basis, having a degree of polymerization of 1 to 6, by the dextrose equivalent value.

7. A process in accordance with claim 1, wherein said resulting liquefied starch has a D.E. of about 5 and the resulting saccharified hydrolysate so produced has a D.E. in the range of from about 10 to about 20.

8. A process for producing a waxy starch hydrolysate in accordance with claim 1, wherein the moisture content of the saccharified product so produced is reduced to a content of less than about 15 percent.

9. A process for producing a waxy starch hydrolysate in accordance with claim 1, wherein said waxy starch is initially heated to a temperature above the gelatinization temperature of the starch prior to subjecting the waxy starch to the reaction with the bacterial alpha-amylase enzyme.

10. A process for producing a waxy starch hydrolysate which comprises treating in a first step an aqueous slurry of a waxy starch having a solids content of from about 20 percent to about 40 percent with a bacterial alpha-amylase enzyme at a temperature of from about 85°C. to about 92°C. to liquefy the waxy starch and to provide an aqueous solution containing a liquefied waxy starch, then subsequently in a second step at reduced temperatures, treating said liquefied waxy starch with a bacterial alpha-amylase enzyme at a temperature below about 80°C. to saccharify the waxy starch and to achieve a waxy starch hydrolysate having a dextrose equivalent value of from about 5 to about 25.

11. A waxy starch hydrolysate having a dextrose equivalent value between 5 and 25 and a saccharide composition wherein the amount of $DP_1$ is in the range of from about 0.1 percent by weight, to about 2.4 percent by weight, dry basis, and the amount of $DP_2$ is in the range of from about 1.3 percent to about 9.7 percent by weight, dry basis, said hydrolysate being further characterized as producing a fluid solution free of opacity (exceptional clarity and complete lack of opaqueness) when the hydrolysate is added to water at solids concentrations specified below:

| DEXTROSE EQUIVALENT OF WAXY STARCH HYDROLYSATE | SOLIDS CONCENTRATION PERCENT BY WEIGHT |
|---|---|
| 10 | 65 – 70 |
| 20 | 75 |
| 25 | 80 |

12. A waxy starch hydrolysate having a dextrose equivalent value between about 5 and about 25, a descriptive ratio greater than about 2, said descriptive ratio being the quotient obtained by dividing the sum of the percentage of saccharides, dry basis, having a degree of polymerization of 1 to 6, by the dextrose equivalent value, a monosaccharide content in the range of from about 0.1 percent by weight, to about 2.4 percent by weight, dry basis, a disaccharide content in the range of from about 1.3 percent to about 9.7 percent, by weight, dry basis, and being further characterized as capable of producing an aqueous solution of exceptional clarity and substantially complete lack of opaqueness when said hydrolysate is added to water.

13. A waxy starch hydrolysate in accordance with claim 12, having a moisture content of less than 15 percent, by weight.

14. A waxy starch hydrolysate in accordance with claim 12, having a moisture content of about 4 percent, by weight and being further characterized as being a waxy starch hydrolysate syrup solid product which is substantially 100 percent soluble and capable of forming an aqueous solution completely free of haze.

* * * * *